Patented Sept. 10, 1929.

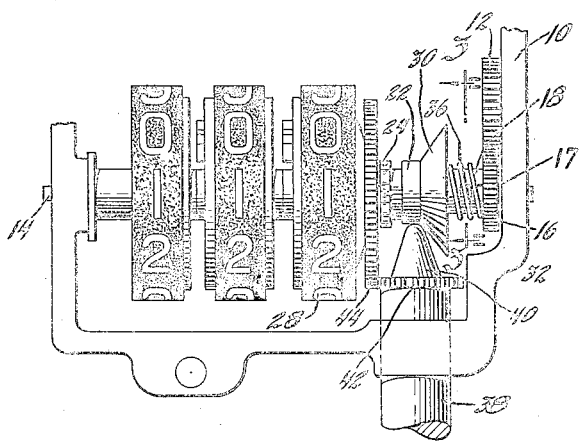

1,727,815

UNITED STATES PATENT OFFICE.

CLARENCE B. DINSMORE, OF FLINT, MICHIGAN, ASSIGNOR TO A C SPARK PLUG COMPANY, OF FLINT, MICHIGAN, A COMPANY OF MICHIGAN.

ODOMETER RESET MECHANISM.

Application filed February 1, 1928. Serial No. 251,085.

My invention relates to odometers and more particularly to the reset mechanism of odometers.

It has for an object the provision of an odometer wherein the spring member which serves to normally hold the clutch member in driving engagement with one of the figure wheels, will be so associated with the clutch member and the gear which drives the latter, that there will be no tendency of any rotating part being pressed against a non-rotating part by this spring, thereby increasing friction and requiring more power to drive the odometer mechanism.

Other objects and advantages will be apparent upon referring to the specification and accompanying drawing, in which:

Figure 1 is a fragmentary view of an odometer, showing the parts in a position whereby the odometer may be reset.

Figure 2 is a fragmentary view corresponding to Figure 1 but showing the parts in driving or normal position.

Figure 3 is a section taken on the line 3—3 of Figure 1.

Figure 4 is a view showing my improved resetting and driving mechanism in perspective.

The numeral 10 indicates the frame of an odometer, from which is rotatably supported an odometer driving gear 12 which is driven in the usual manner from the instrument driving mechanism. Non-rotatably supported in the frame is a shaft 14 on which is journalled the driven gear 16. A washer or spacer 17 may be inserted between the gear 16 and the frame 10, or a flange may be formed on the gear 16 for this purpose. This gear carries a substantially semi-circular extension 18 which extends not quite 180° around the shaft 14. An abutment 20 formed on the end of this extension extends a little more than 180° around the shaft. A clutch member 22 is also rotatably supported on the shaft and has teeth 24 at one end, which teeth are adapted to fit into internal teeth 26 in a figure wheel 28. This clutch member is provided with a conical shaped portion 30 and an extension 32 and abutment 34 which correspond in shape with the extension 18 and abutment 20. A compression spring 36 is mounted around the two extensions and bears at one end against the gear 16 and at the other against the clutch member 22. It will be seen that this spring will serve to normally hold the teeth 24 in engagement with the teeth 26. When it is desired to reset the figure wheels, a reset stem 38 is pressed inwardly and a tapered end portion 40 engages the conical shaped portion 30 and moves the clutch member to the right until the teeth 24 are out of engagement with the teeth 26. A gear 42 secured on the reset stem then meshes with a gear 44 carried on the figure wheel 28, and by turning the reset stem the figure wheel may be reset to any desired mileage in the usual manner.

The function of the abutments 20 and 34 is to limit the axial movement of the clutch member 22 and the gear 16 with respect to each other, so that there will be no possibility of the gear 16 being forced against the frame 10 by the action of the spring. Obviously this would cause friction and would require more power to drive the odometer mechanism. Since the usual odometer is a rather delicate instrument, it is very desirable to reduce friction to a minimum, to insure a longer life for the instrument.

In the ordinary reset mechanism where a spring is employed to normally hold the clutch member in driving engagement with the figure wheels, this spring usually forces some rotating part against a non-rotating part. In my construction, however, it will be seen that the pressure of the spring is taken care of entirely by the manner in which the gear 16 is connected to the clutch member 22, independently of any other parts. When the figure wheels are being rotated by the gear 16, the clutch member, the spring and the gear 16 are rotating as a unit, and are not depending upon any outside means to limit their relative axial movement. It will be readily seen that this is a much more desirable construction than the usual one.

It is thought from the foregoing taken in connection with the accompanying drawing, that the construction and operation of the device will be apparent to those skilled in the art, and that various changes in size, shape, and proportion and details of construction may be made without departing from the spirit and scope of the appended claims.

I claim:

1. In an odometer having a figure wheel, a driving gear, a driven gear, a clutch member adapted to be moved axially with respect to said driven gear, resilient means between said driven gear and said clutch member serving to urge the latter into driving engagement with said figure wheel, and means associated with said driven gear and said clutch member whereby there will be no pressure exerted by said resilient means between said driven gear and any non-rotating part when said clutch member is in driving engagement with said figure wheel.

2. In an odometer having a figure wheel, a driving gear, a driven gear, a clutch member adapted to be moved axially with respect to said driven gear, resilient means between said driven gear and said clutch member serving to urge the latter into driving engagement with said figure wheel, and means associated with said driven gear and said clutch member to limit the axial movement of one with respect to the other.

3. In an odometer having a figure wheel, a driving gear, a driven gear, a clutch member adapted to be moved axially with respect to said driven gear, resilient means between said driven gear and said clutch member serving to urge the latter into driving engagement with said figure wheel, and abutments on said driven gear and said clutch member arranged in such manner as to take the pressure of said resilient means when the clutch member is in driving engagement with said figure wheel.

4. Odometer mechanism comprising a figure wheel, a driving gear, a driven gear having a substantially semi-circular extension provided with an abutment, a clutch member having a substantially semi-circular extension provided with an abutment, said extensions cooperating so that said clutch member will be rotated by said driven gear, a spring surrounding said extensions and serving to urge said clutch member normally into engagement with said figure wheel, said abutments cooperating with each other to limit the movement of said clutch member away from said driven gear.

In testimony whereof I affix my signature.

CLARENCE B. DINSMORE.